United States Patent
Wu et al.

(10) Patent No.: US 6,937,242 B2
(45) Date of Patent: *Aug. 30, 2005

(54) 3-D GRAPHICS CHIP WITH EMBEDDED DRAM BUFFERS

(75) Inventors: Tsailai Terry Wu, San Jose, CA (US); Yudianto Halim, San Jose, CA (US)

(73) Assignee: Silicon Motion, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/796,541

(22) Filed: Mar. 8, 2004

(65) Prior Publication Data

US 2004/0201590 A1 Oct. 14, 2004

Related U.S. Application Data

(63) Continuation of application No. 10/341,852, filed on Jan. 13, 2003, now Pat. No. 6,704,023, which is a continuation of application No. 09/969,450, filed on Oct. 1, 2001, now Pat. No. 6,518,972, which is a continuation of application No. 09/205,505, filed on Dec. 4, 1998, now Pat. No. 6,329,997.

(51) Int. Cl.[7] .............................................. G06F 15/76
(52) U.S. Cl. ........................ 345/519; 345/544; 345/558
(58) Field of Search ................................ 345/501, 519, 345/531, 535, 536, 544, 545, 558

(56) References Cited

U.S. PATENT DOCUMENTS 5,544,306 A    8/1996   Deering et al.
5,548,709 A    8/1996   Hannah et al.
5,650,955 A    7/1997   Puar et al.
6,108,015 A    8/2000   Cross
6,329,997 B1  12/2001   Wu et al.
6,518,972 B1   2/2003   Wu et al.
6,704,023 B1   3/2004   Wu et al.

OTHER PUBLICATIONS

Watanabe et al, "A Modular Architecture for a 6.4 Gbyte/s, 8–Mb DRAM Integrated Media Chip", IEEE Journal of Solid State Circuits, vol. 32, No. 5, May 1997, pp. 635–641.

Junko Yoshida, "Startup Turns Up Heat in 3–D Graphics Chips", Aug. 17, 1998, Electronic Engineering Times, p. 26.

Primary Examiner—Kee M. Tung
(74) Attorney, Agent, or Firm—Blakely, Sokoloff, Taylor & Zafman LLP (57) ABSTRACT

A 3-D graphics chip includes independent internal DRAM buffers each having a wide bandwidth access bus for connection to a 3-D texture rendering drawing engine. The 3-D drawing engine takes advantage of a flexible embedded memory interface to reduce the traditional 3-D pipeline delay by a factor of 3. In a specific embodiment, each of three drawing processes—texture, Z, pixel—retrieves and stores information in a separate embedded drawing buffer via separate wide bandwidth access busses. Access to an external memory is provided via a separate external access bus. In another specific embodiment, the 3-D drawing engine accesses the embedded drawing buffers via read and write FIFO's to maximize the drawing process throughput.

7 Claims, 6 Drawing Sheets

3-D GRAPHICS CHIP WITH EMBEDDED DRAM BUFFERS

This application is a continuation application of U.S. patent application Ser. No. 10/341,852, filed Jan. 13, 2003, now U.S. Pat. No. 6,704,023 which is a continuation application of co-pending U.S. patent application Ser. No. 09/969,450, filed Oct. 1, 2001, now issued as U.S. Pat. No. 6,518,972, which is a continuation application of U.S. patent application Ser. No. 09/205,505, filed Dec. 4, 1998, now issued as U.S. Pat. No. 6,329,997.

FIELD OF THE INVENTION

The invention relates to the field of computer graphics devices and more specifically to specialized processors for accelerating a color, 3-dimensional ("3-D") drawing process used with laptop computers having high-end game and multimedia capability.

BACKGROUND OF THE INVENTION

The acceleration of a color, texture rendering 3-D drawing process is well known in the field of computer graphics. In the past such accelerators have relied primarily upon the use of external 3-D drawing buffers for storage of 3-D process control and 3-D drawing information. However, the use of external drawing buffers has made it difficult to increase accelerator throughput. Yet continuing advances in computer graphics capabilities have pushed a demand for higher bandwidth 3-D drawing processes, having greater throughput, to support high-end games and multimedia applications.

This need for greater throughput has been a special challenge to the designers of 3-D graphics accelerators for use in high-end laptop computers and in some battery-operated hand-held devices. These special markets place a premium on small size and low operating power. The designers of these specialized chips face practical limitations to solving their problems by increasing the number of I/O pins at the periphery of a chip in an effort to continue using external drawing buffers. A typical external memory bus now includes 64 lines which cannot be shared with other I/O signals. Yet many of these chips already have in excess of 200 I/O pins, thus making the addition of 100–200 pins impractical. For this reason, the industry has begun to move away from external memory and toward internal memory.

Recently, some devices have included small static-RAM ("SRAM") cache memories in an effort to provide the higher throughput ("effective processing bandwidth"). A few 3-D graphics accelerators have implemented larger internal SRAM buffers for storage of setup and intermediate drawing information, but these are limited to desktop computers where size and power are not a major consideration.

The use of SRAM for internal storage has several drawbacks for accelerators intended for the high-end laptop market: (1) if limited to internal cache memory only, the improvement in processing bandwidth is not significant; (2) SRAM requires much layout area, limiting the amount of storage which can be provided, and hence the improvement in processing bandwidth; and (3) SRAM is a power hungry technology not lending itself to use in battery operated equipment. These limitations prevent successful use of SRAM for large internal memories on the order of 2 MB or more, which is a size required for the needed improvement in processing throughput.

Recently, several manufacturers have proposed 3-D graphics accelerators for use in the high-end laptop market which include dynamic-RAM ("DRAM") for internal buffer storage. DRAM has the advantages of lower power consumption and smaller layout area for a given memory size. Though these proposed devices promise 2 MB memories and therefore a dramatic improvement in performance, the announced architectures appear to have shortcomings which will severely undercut the manufacturers' claims.

SUMMARY OF THE INVENTION

The present invention overcomes these objections by organizing the internal memory as multiple independent memory banks, each having its own very wide access bus and memory controller. The present invention takes advantage of this internal memory organization by modifying a traditional 3-D drawing engine to take advantage of the memory architecture to increase the 3-D drawing process throughput by a factor of 3. This result is accomplished by connecting each of three drawing processes which comprise a traditional 3-D drawing process to a separate internal memory and then reconfiguring the three drawing processes to reduce unnecessary delays.

In a specific embodiment, the internal memory is implemented as independent memory banks of at least 1 MB each. Each independent memory bank has its own access bus, typically 128 bits wide. The 3-D drawing engine connects to the memories via read and write FIFO's of equivalent width. The modified 3-D drawing engine defines 'concurrent' 3-D drawing processes as opposed to a traditional 'pipelined' architecture.

In another specific embodiment of a 3-D graphics chip having embedded DRAM buffers, the invention includes a matrix of programmable switches which independently connect each of several interrelated drawing processes to one of the independent internal buffers. The switch matrix is programmable by a host computer and is useful for adjusting the graphics accelerator to meet the needs of specific applications. The switch matrix permits any drawing engine to communicate with any internal memory bank, once a host selection has been made.

In another specific embodiment, the invention includes an external bus permitting one or more drawing buffers to be located external to the graphics accelerator. A programmable switch matrix is used to connect selected drawing processes to either an internal buffer or to an external buffer via the external bus, thus providing a simple form of drawing process output to the external buffer.

BRIEF DESCRIPTION OF THE DRAWING

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
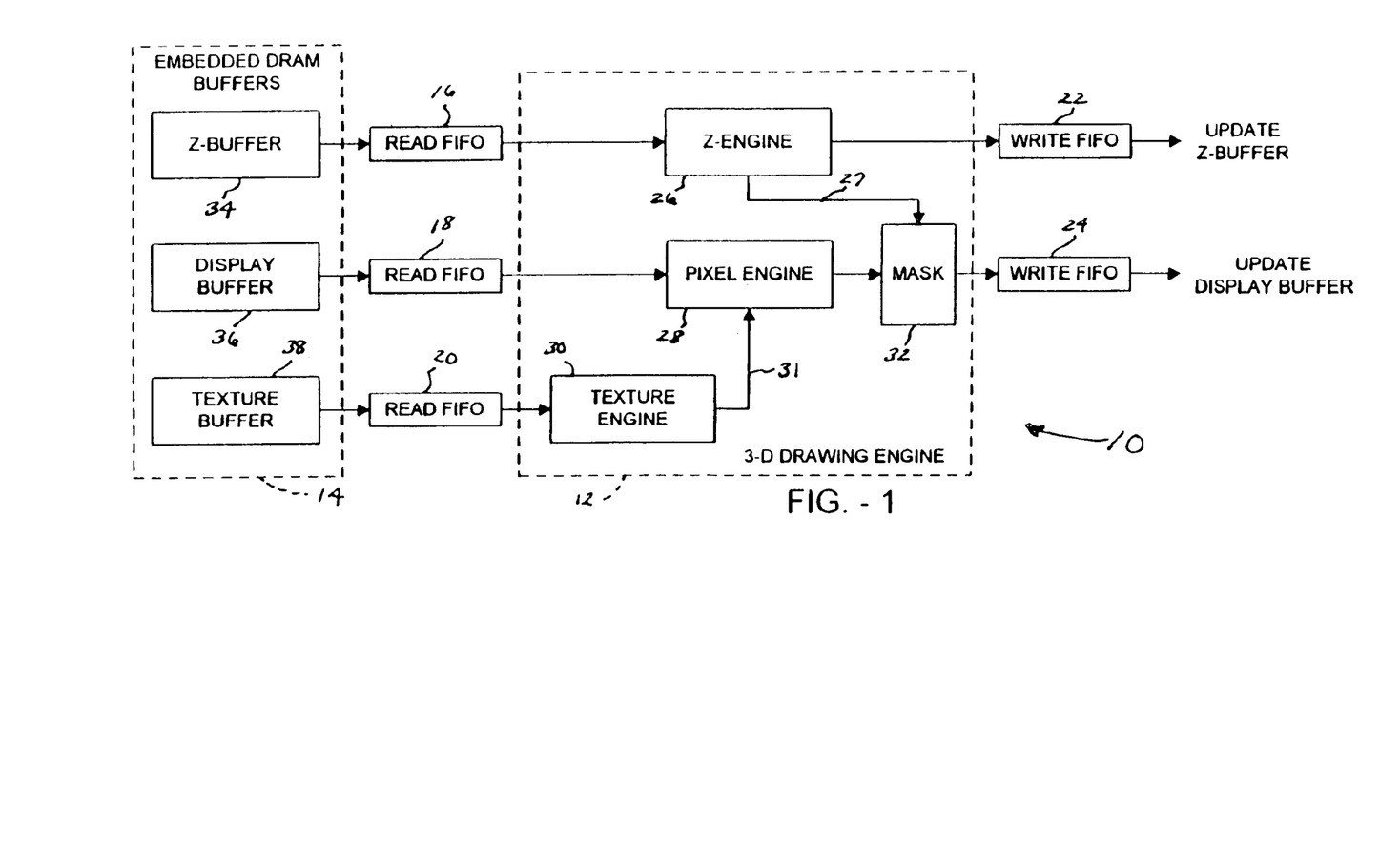
FIG. 1 is a block diagram illustrating a 3-D graphics chip with embedded DRAM buffers, according to one aspect of the present invention.

With reference to FIG. 1, there is shown a block diagram of a 3-D graphics chip having embedded DRAM buffers according to one aspect of the present invention. The 3-D graphics chip is designated generally by the reference numeral 10, and includes a 3-D drawing engine 12, embedded DRAM buffers 14, a plurality of read FIFO's 16, 18, 20, and write FIFO's 22, 24. The 3-D drawing engine 12 includes a Z-engine 26, a pixel engine 28, a texture engine 30, and a mask 32. The embedded DRAM buffers 14 include a Z-buffer 34, a display buffer 36, and a texture buffer 38. Typically, the graphics chip 10 is implemented on a single substrate using a reduced voltage level CMOS technology, for example 3.3V CMOS.

In a specific embodiment of the invention, the display buffer 36 is partitioned into a pair of buffers, commonly referred to as a front display buffer and a back display buffer. The 3-D drawing engine 12 works with the contents of one of the two display buffers, while the contents of the other display buffer is available for output to a display device. When the 3-D drawing engine completes its work with the contents of the one display buffer, it begins to work with the contents of the other display buffer. The display output is taken from the contents of the display buffer the 3-D drawing engine 12 has most recently completed.

The 3-D drawing engine 12 implements a modification of a traditional 3-D texture-blending drawing algorithm such as disclosed in "Direct3D API Specification," by the Microsoft Corp., and the OPENGL™ specification. A traditional 3-D drawing engine accesses drawing information from an external memory via a 64-bit wide bus, and employs a pipelined architecture which imposes a delay on output of a fully rendered color pixel. For example, if 10 pixels are to be drawn, the traditional 3-D drawing engine typically requires 21 unit time intervals to output a first fully rendered color pixel. Once the pipeline is primed, a new fully rendered color pixel is output each 3 unit time periods.

The present invention modifies the traditional pipeline to shorten the pipeline delay by a factor of 3. But in addition, the read FIFO's which connect the 3-D drawing engine with the embedded memories operate independently. Thus drawing information which requires 21 unit time intervals to prime the pipeline in a traditional 3-D drawing engine, is ready to output a first fully rendered color pixel in one unit time interval and to output successive fully rendered color pixels each one unit time interval thereafter. Thus, the earlier statement that the 3-D drawing engine 12 processes a fully rendered color pixel at 3 times the throughput of the traditional engine. The traditional engine operates upon data fields that are 64 bits wide, while a specific embodiment of the present invention operates upon data fields that are 128 bits wide.

As a result of the modification, the 3-D drawing engine defines three concurrent and interrelated drawing processes: a Z-engine 26; a pixel-engine 28 and the mask 32; and a texture-engine 30. The Z-engine drawing process is related to the pixel-engine drawing process by the line 27 which carries Z-mask information from the Z-engine 26 to the mask 32. The texture-engine drawing process is related to the pixel-engine drawing process by the line 31 which carries texture information from the texture engine 30 to the pixel engine 28 where the texture is blended with previous pixel information.

As illustrated in FIG. 1, the Z-engine 26 communicates with the Z-buffer 34 via the read FIFO 16 and the write FIFO 22. In a specific embodiment, all the FIFO's shown in FIG. 1 are 128 bits wide. In similar manner, the pixel engine 28 and the mask 32 communicate with the display buffer 36 via the read FIFO 18 and the write FIFO 24. Finally, the texture engine 30 communicates with the texture buffer 38 via the read FIFO 20. A person skilled in the 3-D drawing engine art will recognize that the traditional 3-D drawing engine has been modified to take advantage of the concurrent access of the three drawing buffers 34, 36, 38.

In a traditional 3-D drawing engine the drawing buffers are typically located in a single external memory which the 3-D drawing engine accesses via a single 64-bit wide memory bus. The need to access the three drawing buffers via the single narrow bus necessitates the pipeline architecture requiring 21 unit time intervals for priming the pipeline (in the example of drawing 10 pixels), and 3 unit time intervals for processing each fully rendered color drawing pixel. Some of the 21 unit time intervals are required for fetching drawing information from the external memory, 64 bits at a time. The remaining unit time intervals are required for processing the fetched drawing information to form updated drawing information, and for writing the updated information back to the external memory. This sequence must be repeated for each 3-D drawing pixel.

In the present invention, however, the three drawing processes concurrently fetch new drawing information, process current drawing information, and store updated drawing information in a continuous stream of 3-D drawing pixels. The result is that the delay through the drawing pipeline is reduced to the minimum required to properly interrelate the three drawing processes. This minimum is one unit time interval, versus the 3 unit time intervals of the traditional 3-D drawing pipeline. So every unit time interval the 3-D drawing engine 12 of the present invention fetches, processes and updates a new 3-D drawing pixel.

Part of the speedup is a result of working with 128 bits at a time versus 64 bits. Another part of the speedup is a result of using independent internal memories versus a single external memory. And another part of the speedup is a result of reorganizing the relationships of the Z-engine 26, the pixel engine 28, and the texture engine 30 to take advantage of the concurrent nature of the memory access to the embedded DRAM buffers 14. A person having an ordinary skill in the art will appreciate that, if it were practical to do so, external memory access bandwidth could be increased by adding sufficient I/O pins to widen an external memory access bus. This expedient, however, will be appreciated to be impractical given the current state of the packaging and the interconnect arts.

Figure 2:
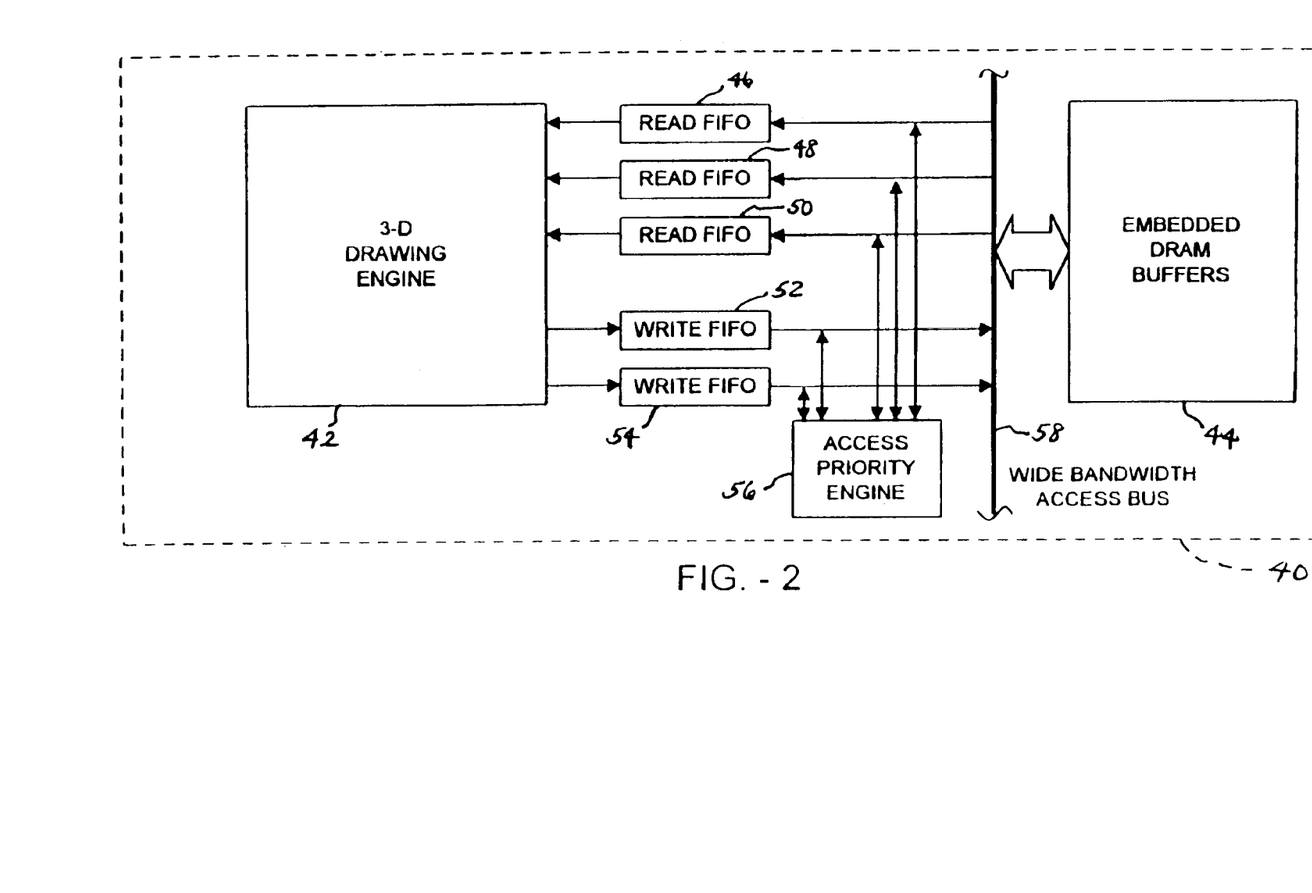
FIG. 2 is a block diagram of a 3-D graphics chip with embedded DRAM buffers and having a wide bandwidth access bus and an access priority engine, according to another aspect of the invention.

FIG. 2 is a block diagram of a 3-D graphics chip with embedded DRAM buffers and having a wide bandwidth access bus and an access priority engine, according to another aspect of the invention. The graphics chip is designated by the reference numeral 40, and is typically implemented on a single substrate using a reduced voltage level CMOS technology.

The 3-D graphics chip 40 includes a 3-D drawing engine 42, embedded DRAM buffers 44, read FIFO's 46, 48, 50, write FIFO's 52, 54, an access priority engine 56, and a wide bandwidth access bus 58.

The 3-D drawing engine 42 and the FIFO's 46–54 correspond to the 3-D drawing engine 12 and FIFO's 16–24 shown in FIG. 1. The FIFO's 46–54 are connected to the embedded DRAM buffers 44 via the wide bandwidth access bus 58, and each FIFO is connected to the access priority engine 56. In a specific embodiment of the graphics chip 40, the width of the wide bandwidth access bus is 128 bits.

The purpose of the access priority engine 56 is to determine which FIFO's are requesting access to the embedded DRAM buffers via the wide bandwidth access bus 58, and to grant access to each requesting FIFO, one-at-a-time, such that each concurrent drawing process (FIG. 1) obtains needed buffer access. The access priority engine grants access requests in a dynamic manner such that no FIFO or group of FIFO's is permitted to 'hog' the wide bandwidth access bus 58. The access priority engine 56 maximizes the use of the available bus bandwidth by insuring two things: (1) that no FIFO or group of FIFO's can prevent any drawing process from gaining needed buffer access; and (2) that if the bus is free and at least one FIFO is requesting access, the at least one FIFO will be granted bus access. This process results in a tendency for read FIFO's to fill and for write FIFO's to empty.

It is important to keep in mind, however, that even though the FIFO's are competing for access and that the access, on a short term basis, is not always granted in the same sequence, the drawing information being read from the read FIFO's by the concurrent drawing processes, and stored into the write FIFO's by the drawing processes, occurs in an order determined by the interrelated drawing processes. The FIFO's and access priority engine permit the drawing processes to access the embedded buffers at a maximum rate determined by the bandwidth of the wide bandwidth access bus.

Figure 3:
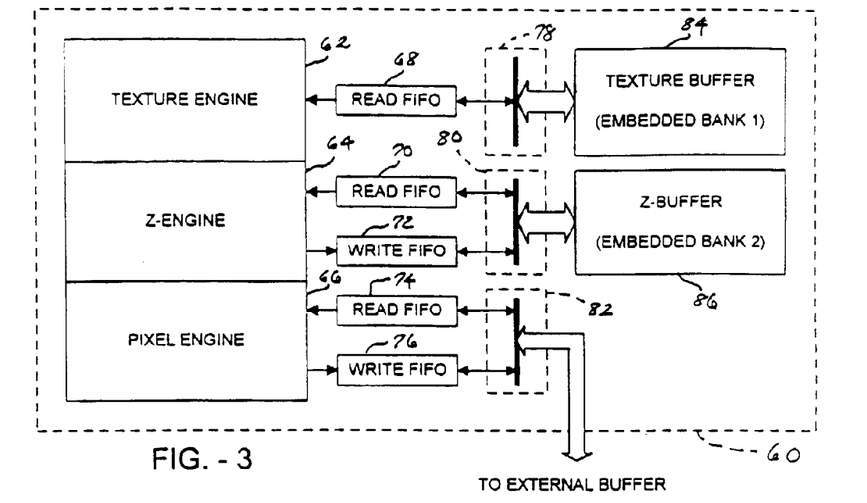
FIG. 3 is a block diagram which illustrates a 3-D graphics chip with dual embedded buffers, each having a wide bandwidth access bus, and the chip also having an access bus for connection to an external buffer.

Another specific embodiment of the invention is illustrated in FIG. 3, a block diagram showing a 3-D graphics chip with dual embedded buffers, each having a wide bandwidth access bus, and the chip also having an access bus for connection to an external buffer. The graphics chip is designated by the reference numeral 60, and is typically implemented on a single substrate using a reduced voltage level CMOS technology.

The 3-D graphics chip 60 includes a texture engine 62, a Z-engine 64, a pixel engine 66, read FIFO's 68, 70, write FIFO's 72, 74, 76, wide bandwidth access busses 78, 80, an external access bus 82, an embedded DRAM texture buffer 84, and an embedded DRAM Z-buffer 86. A person having an ordinary level of skill in the art will appreciate that the texture engine 62 corresponds to the texture engine 30 of FIG. 1, while the Z-engine 64 corresponds to the Z-engine 26 of FIG. 1, and the pixel engine 66 corresponds to the pixel engine 28 and the mask 32 of FIG. 1. It will also be appreciated that the three 3-D drawing engines 62–66 implement concurrent, interrelated drawing processes as described above with respect to FIGS. 1, 2.

Further improvement in the drawing process throughput is obtained using the architecture illustrated in FIG. 3. The embedded DRAM buffer is implemented as separate memory banks 84, 86, each with its own wide bandwidth access bus 78, 80, respectively. Each access bus has its own access priority engine (56 of FIG. 2). In a specific embodiment of the invention, the wide bandwidth access bus 78 has a width of 128 bits, while the width of bus 80 is also 128 bits, and the width of the external access bus is 64 bits.

In the specific embodiment illustrated in FIG. 3, the texture buffer resides within the embedded DRAM memory bank 84. As shown in FIG. 1, the texture engine 30 does not write back to the texture buffer 38. Therefore in FIG. 3 only the read FIFO 68 accesses the embedded DRAM memory bank 84 via the wide bandwidth access bus 78. The Z-engine 64 of FIG. 3 accesses the Z-buffer in the embedded DRAM memory bank 86 via read FIFO 70, write FIFO 72, and the wide bandwidth access bus 80. The pixel engine 66 accesses a display buffer located in an external memory (not shown).

As a result of the arrangement illustrated in FIG. 3, each drawing engine is able to access its respective drawing buffer without competition from another drawing engine. In addition, the location of the display buffer in an external memory provides a display output (recall that the display buffer is typically partitioned into 'front' and 'back' buffers and that one of the buffers is always being used by the pixel engine while the alternate buffer is being used by a display process, and that the two buffers are interchanged as the pixel engine and the display process complete with the contents of their respective buffers).

The consequence of the lack of competition for buffer access between the interrelated concurrent 3-D drawing processes is that 3-D drawing engine throughput is significantly increased.

Figure 4:
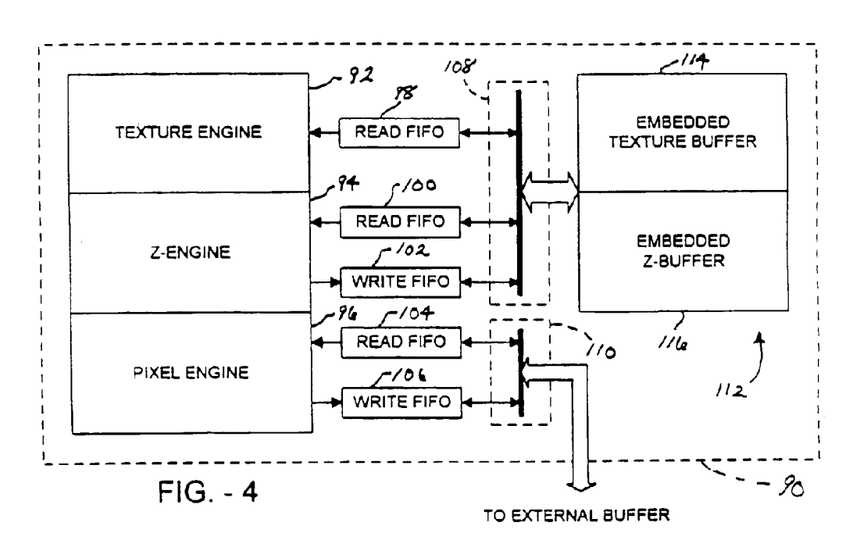
FIG. 4 is a block diagram of another embodiment of the 3-D graphics chip showing a single embedded buffer partitioned into two drawing buffers.

FIG. 4 is a block diagram which illustrates another specific embodiment of a 3-D graphics chip having embedded DRAM buffers in which the texture buffer and the Z-buffer reside within a single embedded DRAM while the display buffer is located in an external memory.

The graphics chip is designated by the reference numeral 90, and includes a texture engine 92, a Z-engine 94, a pixel engine 96, read FIFO's 98, 100, write FIFO's 102, 104, 106, a wide bandwidth access bus 108 and corresponding access priority engine (not shown), an external access bus 110 and corresponding access priority engine (not shown), a single embedded DRAM memory bank, designated generally by the reference numeral 112, including a texture buffer 114 and a Z-buffer 116.

Though not illustrated in FIG. 4, a person having an ordinary level of skill in the art will appreciate that the wide bandwidth access bus 108 and the external access bus-110 each include a corresponding priority access engine which serves the same function as that described with respect to the priority access engine 56 of FIG. 2.

The effective drawing process throughput in the specific embodiment illustrated in FIG. 4 is not as high as the throughput for the embodiment illustrated in FIG. 3. The reason for the difference is readily apparent by examining the relationship between the texture engine 92 and the texture buffer 114 on the one hand and the Z-engine 94 and the Z-buffer 116 on the other hand. In FIG. 3 each 3-D drawing engine accesses its respective buffer via a separate access bus, while in FIG. 4 the two 3-D drawing engines 92, 94 access their respective drawing buffers via the single wide bandwidth access bus 108. In the embodiment illustrated in FIG. 3, the Z-engine 64 and the texture engine 62 do not compete for access to their respective drawing buffers, while in FIG. 4 the two 3-D drawing engines 92, 94 do compete.

It should be pointed out that the 3-D drawing engines in each of FIGS. 1–4 are able to operate more rapidly than the effective bandwidths of their respective drawing buffer accesses. Thus, if the access bandwidth is increased, the total graphics chip throughput will be increased. It is for that reason that going from the single bank of embedded drawing buffers 112 in FIG. 4 to the dual banks of embedded drawing buffers 84, 86 in FIG. 3 provides a significant increase in drawing process throughput.

Figure 5:
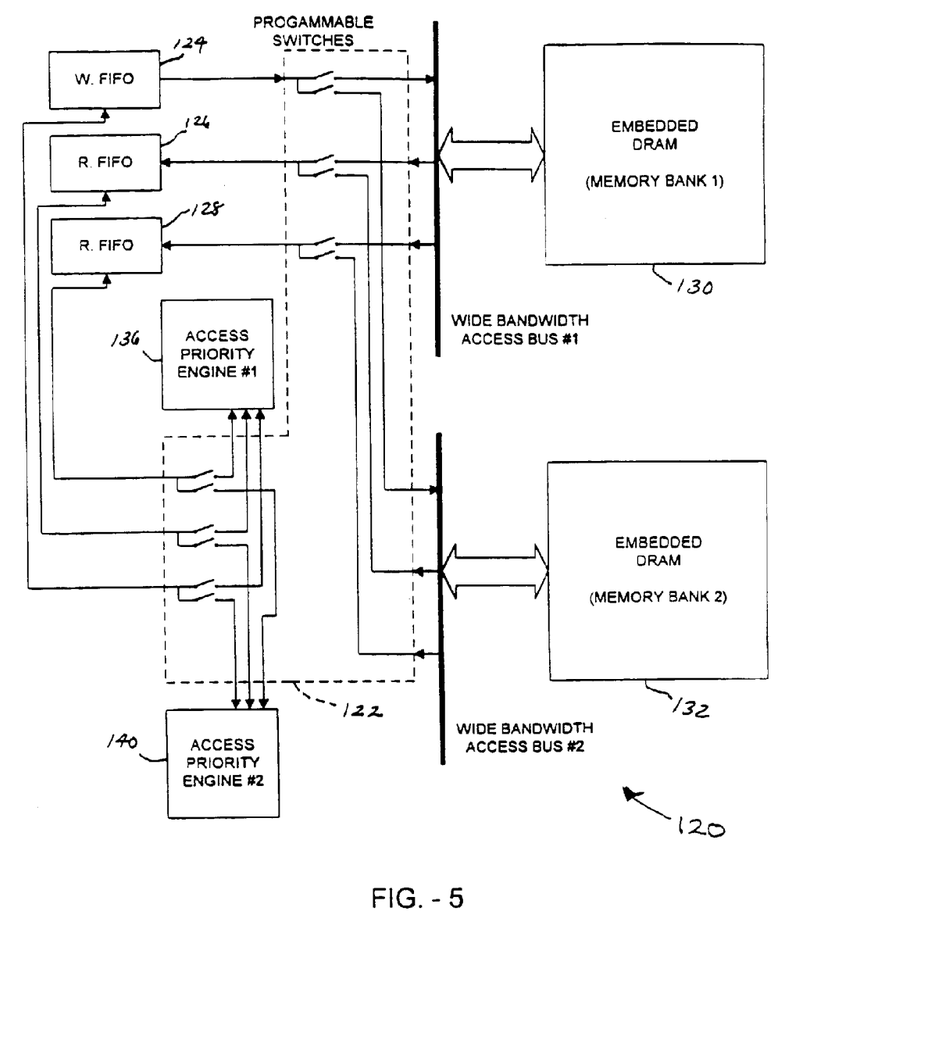
FIG. 5 is a block diagram which illustrates a plurality of programmable switches used to selectively connect read and write FIFO's to one of two embedded DRAM buffers.

In another embodiment of the invention, a matrix of programmable switches permits any FIFO to be connected to any one of several wide bandwidth access busses, depending upon the number of such busses in the embodiment. FIG. 5 is a block diagram which illustrates a portion of a 3-D graphics chip designated generally by-the reference numeral 120.

The graphics chip 120 includes a matrix of programmable switches 122, a write FIFO 124, two read FIFO's 126, 128, a first embedded DRAM 130, a second embedded DRAM 132, a first wide bandwidth access bus 134 and corresponding first access priority engine 136, and a second wide bandwidth access bus 138 and corresponding second access priority engine 140.

The switches of the matrix 122 are all independently programmable, enabling a connection to be established between any FIFO 124, 126, 128 and either wide bandwidth access bus 134, 138 and corresponding access priority engine 136, 140. Such programmable switching matrices are well known in the art. In a specific embodiment, the switches are programmable by a host device.

The use of the switch matrix 122 introduces a significant flexibility into the 3-D graphics chip as it permits any drawing buffer to be located in either embedded DRAM 130, 132 or, because each switch of the matrix 122 is individually programmable, to be located within a single embedded DRAM. A person having an ordinary level of skill in the art will appreciate that the embodiment illustrated in FIG. 5 is exemplary only and that the switch matrix can be applied in additional ways to increase the flexibility of the 3-D graphics chip 120.

Figure 6:
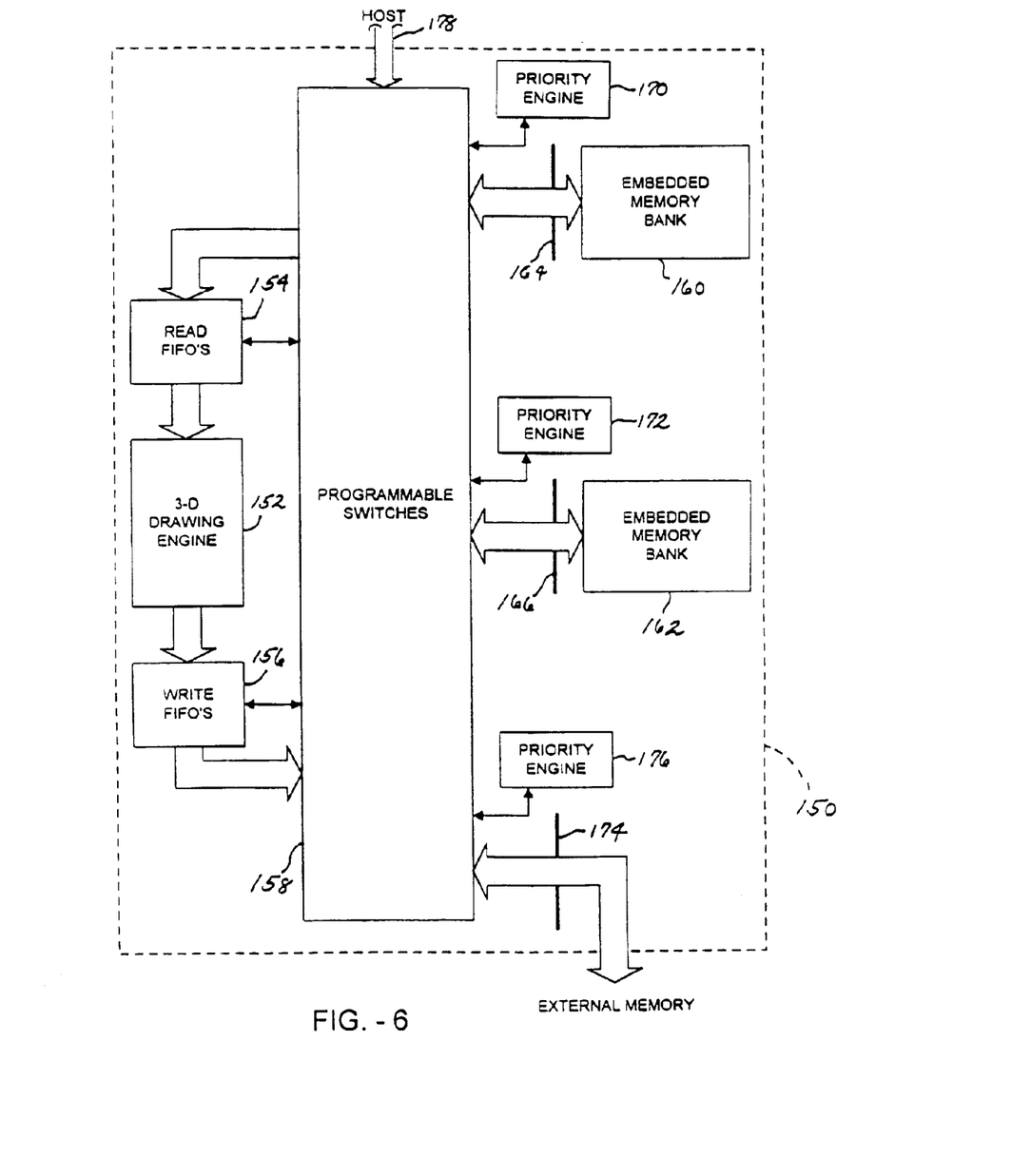
FIG. 6 is a block diagram which illustrates a 3-D graphics chip having a pair of independent embedded DRAM memories, a group of programmable switches controllable by a host device for connecting portions of a 3-D drawing engine to one or the other embedded memory, or to an external memory.

FIG. 6 is a block diagram which illustrates another specific embodiment of a 3-D graphics chip having embedded DRAM buffers. The graphics chip is designated by the reference numeral 150, and is typically implemented on a single substrate using a reduced voltage level CMOS technology.

The 3-D graphics chip 150 includes a 3-D drawing engine 152, a plurality of read-FIFO's 154, a plurality of write FIFO's 156, a programmable switch matrix 158, two embedded DRAM memory banks 160, 162, two wide bandwidth access busses 164, 166, with corresponding priority access engines 170, 172, an external access bus 174 with corresponding priority access engine 176, and a host access port 178.

Though not explicitly shown, the 3-D drawing engine 152 includes a texture engine (62 of FIG. 3), a Z-engine (64 of FIG. 3), and a pixel engine (66 of FIG. 3). The read FIFO's 154 include one read FIFO for each of the three specialized drawing processes (texture, Z, pixel) corresponding to read FIFO's 68, 70, 74 of FIG. 3. The write FIFO's 156 include one write FIFO for each of the Z and pixel drawing processes corresponding to write FIFO's 72, 76 of FIG. 3.

In a specific embodiment of the 3-D graphics chip shown in FIG. 6, each wide bandwidth access bus 164, 166 is 128 bits wide. Each embedded DRAM memory bank 160, 162 provides 2 MB of storage. Each read FIFO and each write FIFO is 128 bits wide by 64 bits deep. The external access bus 174 is 64 bits wide. When the programmable switch matrix 158 is configured to place a drawing buffer in an external memory, the FIFO (or FIFO's) for that drawing buffer are programmed to be 64 bits wide in order to match the width of the external access bus to the width of the FIFO's.

In a specific application, the switch matrix 158 is configured (via the host access port 178) to locate the texture buffer in the embedded DRAM memory 160, to locate the Z-buffer in the embedded DRAM memory 162, and to locate the display buffer in an external memory via connection through the external access bus 174.

In another specific application, the switch matrix 158 is configured to locate both the texture buffer and the Z-buffer in the embedded DRAM memory 160, and to locate the display buffer in the embedded DRAM memory 162.

Figure 7:
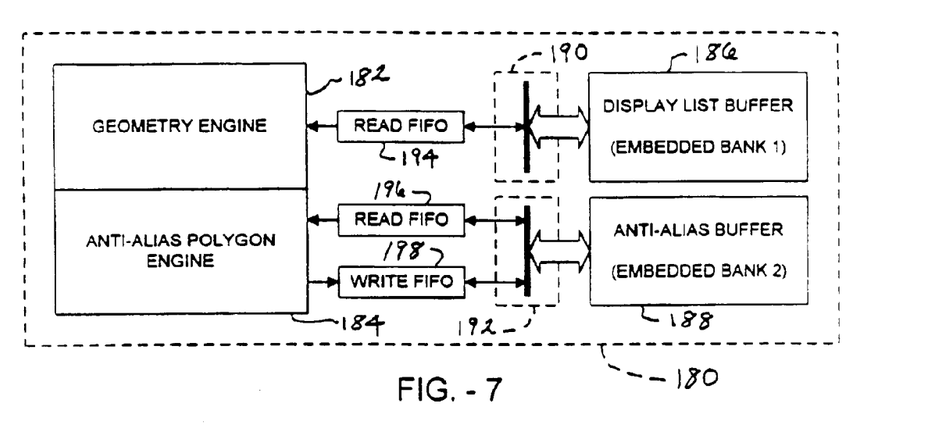
FIG. 7 is a block diagram of a 3-D graphics chip having a pair of independent embedded DRAM memories for storing drawing engine control information and 3-D drawing information.

In yet another specific embodiment, the programmable switch matrix 158 of the 3-D graphics chip 150 is configured to locate drawing control information in a specific embedded memory bank. An example of this embodiment is illustrated in FIG. 7 which is a block diagram of a 3-D graphics chip designated by the reference numeral 180 (the programmable switch matrix is not shown).

The 3-D graphics chip 180 includes a geometry engine 182, an anti-aliasing polygon engine 184, a first embedded DRAM memory bank 186 defining a display list buffer, a second embedded DRAM memory bank defining an anti-aliasing buffer, a first wide bandwidth access bus 190 (and access priority engine, not shown, but see FIGS. 2, 6), a second wide bandwidth access bus 192 (and access priority engine, not shown), read FIFO's 194, 196, and write FIFO 198.

The display list buffer 186 stores geometric attributes of 3-D graphics. The display list buffer 186 is initially loaded by the host (see host port 178 of FIG. 6) and the contents of the display list buffer are locally available, so that it is unnecessary to request these from the host each time they are needed. In actual use, the geometry engine 182 operates concurrently with the 3-D drawing engine (152 of FIG. 6). Thus a portion of the embedded memories 186, 188 is devoted to a Z-buffer (86 of FIG. 3) and a texture buffer (84 of FIG. 3) while the portion shown is used for a display list buffer.

The anti-aliasing buffer stores 3-D drawing information, and the anti-aliasing polygon engine 184 is part of a 3-D drawing engine (not previously shown). Thus FIG. 7 illustrates the embedded DRAM memories used to store both drawing engine control information (the display list buffer 186), and 3-D drawing information (the anti-aliasing buffer 188).

While the invention has been described in relation to the embodiments shown in the accompanying drawing figures, other embodiments, alternatives and modifications will be apparent to those skilled in the art. It is intended that the specification be exemplary only, and that the true scope and spirit of the invention be indicated by the following claims.

What is claimed is:

1. A graphics chip having an embedded DRAM, the chip comprising:
   an embedded DRAM partitioned into a plurality of embedded drawing buffers;
   a drawing engine to concurrently access the embedded drawing buffers for rendered drawing information, the drawing engine to implement concurrent drawing processes, and the drawing processes interrelated in a predetermined manner;

a plurality of independent read FIFO buffers and write FIFO buffers used by the concurrent drawing processes to access the embedded drawing buffers; and an access priority engine to communicate with substantially all FIFO buffers needing access to a given embedded drawing buffer, and grant access priority in a dynamic manner to each of such FIFO buffers serially.

2. The graphics chip of claim 1, further including a wide bandwidth access bus to connect a FIFO buffer having access priority with the embedded DRAM.

3. The graphics chip of claim 1, wherein each FIFO buffer has its own address register and offset register permitting each FIFO buffer to access the entire address space of the embedded DRAM.

4. A graphics chip having an embedded DRAM buffer, the chip comprising:

an embedded DRAM partitioned into a plurality of embedded drawing buffers;

a drawing engine to concurrently access the embedded drawing buffers for rendered drawing information, the drawing engine to implement concurrent drawing processes, and the drawing processes interrelated in a predetermined manner;

a plurality of independent read FIFO buffers and write FIFO buffers used by the concurrent drawing processes to access the embedded drawing buffers; and wherein the embedded DRAM is arranged in at least two independent memory banks, each of the memory banks includes a separate wide bandwidth access bus, and each wide bandwidth access bus includes a corresponding access priority engine communicating with at least one of the read and write FIFO buffers.

5. The graphics chip of claim 4, further comprising a plurality of programmable switches, each FIFO buffer connectable to a selected access bus and a corresponding access priority engine via the programmable switches.

6. The graphics chip of claim 5, further comprising at least two embedded drawing buffers located within a single memory bank of the embedded DRAM, and the FIFO buffers for the corresponding drawing processes connected to the access bus and the priority engine for the memory bank via the programmable switches.

7. The graphics chip of claim 5, further comprising means permitting a host device to program the switches for configuring the drawing processes via FIFO buffers to access drawing buffers in selected memory banks.

* * * * *